United States Patent [19]

Krupp

[11] 4,000,669
[45] Jan. 4, 1977

[54] CENTER DEVICE

[76] Inventor: Ernest E. Krupp, 19916 Thousand Oaks, Clemens, Mich. 48043

[22] Filed: Jan. 26, 1976

[21] Appl. No.: 652,423

[52] U.S. Cl. .............................................. 82/33 R
[51] Int. Cl.² ........................................ B23B 23/04
[58] Field of Search ................................. 82/33, 31

[56] References Cited
UNITED STATES PATENTS

| | | | |
|---|---|---|---|
| 2,463,385 | 3/1949 | Holohan | 82/33 |
| 2,520,473 | 8/1950 | Shepard | 82/33 |
| 2,704,006 | 3/1955 | Rost | 82/33 |
| 3,316,785 | 5/1967 | Nakane | 82/33 |
| 3,519,096 | 7/1970 | Lunzer | 82/33 X |
| 3,943,804 | 3/1976 | Wolski et al. | 82/33 |

*Primary Examiner*—Leonidas Vlachos
*Attorney, Agent, or Firm*—William L. Fisher

[57] ABSTRACT

Improvement in a machine tool center device having a hollow body and a center shaft therein, the shaft having a conical front end, a bearing between the body and shaft for moveably supporting the latter, the improvement comprising a center device which has an arrangement for converting the same from a live center to a dead center and vice versa, an arrangement for supporting the shaft in the body for both rotation and reciprocation in respect thereto, the conversion arrangement preventing rotation of the shaft while permitting reciprocation thereof, the conversion arrangement being accessible from the exterior of the body for insertion or removal in respect thereto, a yieldable mechanism in the body operative upon the shaft for urging the front end outwardly of the body, a thrust cap rotatably carried on the front end of the body having an aperture therein through which the front end projects, the thrust cap being held fast against reciprocative movement relative to the body, a nose cap carried on the thrust cap, the nose cap having an aperture therein through which the front end projects, the shaft, in use of the center device, being yieldably retracted in respect to the body by the workpiece so that the latter abuts the nose cap, the nose cap serving as a locator for the workpiece and rotating therewith.

4 Claims, 10 Drawing Figures

U.S. Patent   Jan. 4, 1977   4,000,669
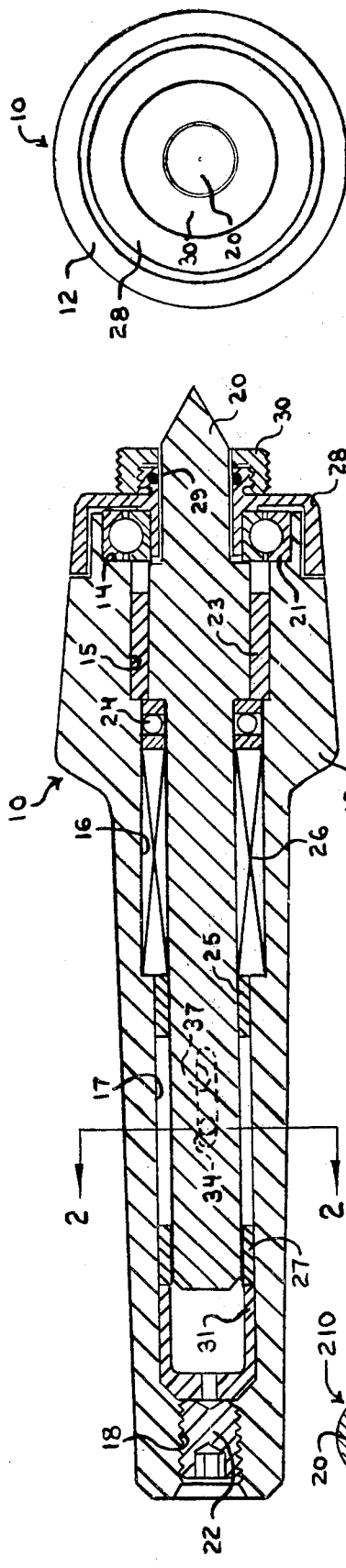

CENTER DEVICE

My invention relates to machine tools.

The principal object of my invention is the provision of an improved center for machine tools which has a number of advantages including saving time and labor in the handling of workpieces to be machined.

The foregoing object of my invention and the advantages thereof will become apparent during the course of the following description, taken in conjunction with the accompanying drawings, in which:

FIGS. 1, 2 and 3 are, respectively, longitudinal and transverse sectional and end elevational views of a machine tool center embodying my invention;

FIGS. 4 and 5 are partial longitudinal sectional views of said embodiment of my invention shown in use with a workpiece;

FIG. 6 is a partial longitudinal sectional view of another embodiment of my invention shown in use with a workpiece;

FIGS. 7 and 8 are, respectively, longitudinal and transverse sectional views of still another embodiment of my invention;

FIG. 9 is a longitudinal sectional view of a part of said last-mentioned embodiment; and FIG. 10 is a longitudinal sectional view of still another embodiment of my invention.

Referring to the drawings in greater detail and first to the embodiment shown in FIGS. 1-5, 10 generally designates the same which comprises a hollow body 12 having cavities 14-18 therein. A shaft 20 having a conically shaped front end is slidably carried in the cavities 14-17. The cavity 18 at the rear end of the body 12 is threaded and threadably engages a plug 22. Ahead of the plug 22 is a cup 31 with a central aperture therein for lubricating the interior of the body 12 when desired. Said cup 31 has other purposes which will appear hereinafter. The shaft 20 is capable of rotating on its axis and sliding back and forth in said body 12 via roller bearings 23, 25 and 27 press fitted in the cavities 15 and 17, respectively. When the shaft 20 is allowed to rotate the center 10 is then a live center. When the shaft 20 is allowed to slide only and prohibited from rotating the center 10 it is then like a dead center. What determines whether the shaft 20 is permitted to rotate or not is the disengagement or engagement, respectively, of the inner end of the screw 34 in an elongated slot 37 provided in a side of the shaft 20. If the screw 34 is tightened sufficiently in the body 12 the inner end thereof will project into said slot 37 and said shaft 20 will be prevented from rotating but will be able to reciprocate. If the screw 34 is backed off sufficiently or replaced with a screw of the same threads and diameter but having no projecting inner end said shaft 20 will be able to both rotate and reciprocate.

The shaft 20 is yieldably urged outwardly of the front end of said body 12 by a compression spring 26 in the cavity 16. The front end of said spring 26 operates against a thrust bearing 24 which is slip-fitted on the shaft 20 and has a slip fit with the cavity 16. Said thrust bearing 24 permits relative rotation between said spring 26 and said shaft 20. The front end of the body 12 rotatably carries a thrust cap 28 via a ball bearing 21 having its outer race press-fitted in said cavity 14. Said thrust cap 28 is press-fitted on the inner race of said ball bearing 21. The thrust cap 28 is provided with a reduced diameter threaded shank, as shown, which threadably engages a centrally apertured nose cap 30 through which aperture the front end of the shaft 20 normally projects. Said thrust cap 28 and nose cap 30 serve to support the front end of the shaft 20 as well as to locate a workpiece and rotate with the latter.

An O-ring 29 carried in said shank assists in keeping foreign matter from entering the body 12 from the front end thereof. The front end of the body 12 is forwardly tapered to shed liquid coolant sprayed on the workpiece which may be splashed on said body 12. The rear shank of the body 12 is rearwardly tapered to fit the machine tool and because of this latter taper it is advantageous to have a small diameter for the plug 22 which is possible because of the larger diameter for the cup 31. Said cup 31 can be pushed upon with a suitable instrument inserted from the rear of the body 12 through the cavity 18. Said cup 31 is a snug fit in said cavity 17 and serves, when so pushed upon, to push the bearings 27 and 25 and the spring 16 out the front end of the body 12 in the event these must be changed. Said cup 31 also serves to locate the rear-most bearing 27 for maximum support at the rear of the shaft 20 while accommodating rearward travel of the rear end of said shaft 20.

Workpieces $W_1$ and $W_2$ having different sized female centers in the ends thereof are shown in engagement with the shaft 20 in FIGS. 4 and 5, respectively, to illustrate the different retracted positions the shaft 20 may assume in the body 12 in use on a machine tool. It should be noted that in each instance the workpiece abuts the nose cap 30 which of course always rotates therewith.

In the embodiment 110 shown in FIG. 6 the nose cap 130 has a central aperture therein smaller than the diameter of the shaft 20 so that only the conical front end of the latter can project through said aperture. This center 110 is used for workpieces having diameters less than that of said shaft 20. FIG. 6 also illustrates the use of each of the embodiments of my invention in the headstock of a machine tool in conjunction with a center in the tailstock thereof which latter center is usually a dead center, such as the center shown and indicated at 40.

The workpiece $W_3$ is shown as having a shoulder thereon to further illustrate the advantage of having a fixed face such as the nose cap 130 for said workpiece $W_3$ to abut. In this way lengths on the workpiece, such as the distance between the nose cap 130 and said shoulder, can be easily maintained.

In the embodiment 210 shown in FIG. 7 the ball bearing 121 is retained in the cavity 114 by a snap ring 132 which may also be used in the embodiment 10, if desired. A second ball bearing 123 is provided between the ball bearing 121 and the thrust bearing 124. Said ball bearing 123 is press-fitted on the shaft 120 and makes a slip fit with the cavity 115 and moves with said shaft 120 against the thrust bearing 124 to compress the spring 126 in use of the embodiment 210. The slot 137 is an open-ended through-slot in the rear end of the shaft 120. A cross pin 134, which is fitted in opposite sides of the body 112, extends through said slot 137. The nose cup 230 shown in FIG. 9 for threading on the thrust cap 128 has a central aperture smaller in diameter than that of said shaft 120 for use with smaller diameter workpieces. Of course thrust caps and nose caps having many other configurations may be employed in my invention.

In the embodiment 310 shown in FIG. 10 a sleeve bearing 46 is press-fitted in the cavity 215 for slidably supporting the shaft 220. The spring 226 is located behind the sleeve 46 and a washer 44, in lieu of a thrust bearing, is used to engage the front end of said spring 226. Said washer 44 is rotatable in respect to said shaft 20 but reciprocable therewith by reason of a shoulder on said shaft 20. A centrally apertured plate 42, which is likewise of larger diameter than the plug 222, is used in lieu of a cup to push said washer 44, the spring 226, and the sleeve bearing 46 out the front end of the body 212 when it is desired to repair said embodiment 310. The inner race of the ball bearing 221 is press-fitted on said sleeve 46 and, in this instance, the thrust cap 228 is press-fitted on the outer race of said bearing 221.

In use of my invention, a workpiece is supported on two opposing centers (at least one of which is my invention) and rotatably driven by the headstock driver while a machining operation, such as grinding or turning, is carried out on the diameter of the workpiece. The center shaft 20, 120 or 220 retracts under pressure and allows the workpiece to locate on a face which is stationary in respect to reciprocation but free to rotate with the workpiece. This face is that of the nose cap 30, 130 230 or 330 which rotates with the workpiece as does also the center shaft 20, 120 or 220 when the center 10, 110, 210 or 310 is arranged to be a live center. This arrangement of the workpiece abutting a locating face simplifies the holding of lengths of workpieces from the locating face while the diameters of said workpieces are being machined.

It will thus be seen that there has been provided by my invention a machine tool center in which the object hereinabove set forth, together with many thoroughly practical advantages, has been successfully achieved. While preferred embodiments of my invention have been shown and described, it is to be understood that variations and changes may be resorted to without departing from the spirit of my invention as defined by the appended claims.

What I claim is:

1. Improvement in a machine tool center device having a hollow body and a center shaft therein, said shaft having a conical front end, bearing means between said body and shaft for moveably supporting the latter, said improvement comprising a center device which has means for converting the same from a live center to a dead center and vice versa, means for supporting said shaft in said body for both rotation and reciprocation in respect thereto, said converting means preventing rotation of said shaft while permitting reciprocation thereof, said converting means being accessible from the exterior of said body for insertion or removal in respect thereto, yieldable means in said body operative upon said shaft for urging said front end outwardly of said body, a thrust cap rotatably carried on the front end of said body having an aperture therein through which said front end projects, said thrust cap being held fast against reciprocative movement relative to said body, a nose cap carried on said thrust cap, said nose cap having an aperture therein through which said front end projects, said shaft, in use of said center device, being yieldably retracted in respect to said body by said workpiece so that the latter abuts said nose cap, said nose cap serving as a locator for said workpiece and rotating therewith.

2. Improvement as claimed in claim 1, said nose cap being interchangeable with other nose caps having different central apertures therein which are preselected in accordance with the diameter of the workpiece.

3. Improvement as claimed in claim 1, said body supporting ball bearing means for rotating said thrust cap on the front end thereof, said ball bearing means having an inner race, a portion of said thrust cap made fast to said inner race and serving to support the front end of said shaft.

4. Improvement as claimed in claim 1, said body having a plug at the rear end thereof, and a member ahead of said plug having an aperture therein for lubricating the interior of said body through the rear end thereof, said member being cup-shaped to accommodate travel of the rear end of said shaft, said cup-shaped member serving to locate a part of said bearing means in said body and also serving a disassembly function in said device.

* * * * *